United States Patent
Roark et al.

(10) Patent No.: US 6,787,118 B2
(45) Date of Patent: Sep. 7, 2004

(54) SELECTIVE REMOVAL OF CARBON MONOXIDE

(75) Inventors: Shane E. Roark, Boulder, CO (US); James H. White, Boulder, CO (US)

(73) Assignee: Eltron Research, Boulder, CO (US)

( * ) Notice: Subject to any disclaimer, the term of this patent is extended or adjusted under 35 U.S.C. 154(b) by 302 days.

(21) Appl. No.: 10/039,771

(22) Filed: Oct. 29, 2001

(65) Prior Publication Data

US 2002/0114746 A1 Aug. 22, 2002

Related U.S. Application Data

(63) Continuation-in-part of application No. 09/468,034, filed on Dec. 20, 1999, now Pat. No. 6,458,741.
(60) Provisional application No. 60/244,049, filed on Oct. 27, 2000.

(51) Int. Cl.⁷ .............................. C10K 3/04; C01B 3/50
(52) U.S. Cl. ....................... 423/247; 422/177; 422/211; 502/304
(58) Field of Search ................................ 422/177, 211; 423/247; 502/304

(56) References Cited

U.S. PATENT DOCUMENTS

| | | | |
|---|---|---|---|
| 3,885,020 A | 5/1975 | Whelan ...................... | 423/245 |
| 4,661,329 A | 4/1987 | Suzuki et al. ................ | 423/245 |
| 4,968,656 A | 11/1990 | Fukuda et al. ............... | 502/244 |
| 5,061,464 A | 10/1991 | Cordonna, Jr. et al. .. | 423/213.5 |
| 5,843,195 A | 12/1998 | Aoyama ..................... | 48/127.7 |
| 5,925,590 A | 7/1999 | White et al. ................ | 502/302 |
| 6,458,741 B1 * | 10/2002 | Roark et al. ................ | 502/303 |

OTHER PUBLICATIONS

Bethke, G. K. and Kung, H. H., "Selective CO oxidation in a hydrogen–rich stream over Au/γ–Al₂O₃ catalysts," (Mar. 2000) Appl. Cat. A: Gen. 194–195:43–53.

Gonzalez–Velasco, J. R. et al., "Contribution of cerium/zirconium mixed oxides to the activity of a new generation of TWC," (Sep. 1999) Appl. Catal. B. Env. 22:167–178.

Haruta, M. et al., "Novel gold catalysts for the oxidation of carbon monoxide at a temperature far below 0° C," (1987) Chem. Lett. 405–408.

Haruta, M. et al., "Gold catalysts prepared by coprecipitation of low–temperature oxidation of hydrogen and of carbon monoxide," (1989) J. Catal. 115:301–309.

Haruta, M., "Size– and support–dependency in the cataylsis of gold," (1997) Catalysis Today, 36:153–166.

Heiz, U. et al., "Catalytic oxidation of carbon monoxide on monodispersed platinum clusters: each atom counts," (Mar. 1999) J. Am. Chem. Soc. 121:3211–3217.

(List continued on next page.)

Primary Examiner—Stanley S. Silverman
Assistant Examiner—Maribel Medina
(74) Attorney, Agent, or Firm—Greenlee, Winner and Sullivan, P.C.

(57) ABSTRACT

Catalyst compositions are provided that are useful in selectively removing carbon monoxide from a hydrogen-containing gas. These catalyst compositions preferably have the formula: $nN/Ce_{1-(x+y+z)}A_xA'_yA''_zO_{2-\delta}$, where A, A', A" are independently selected from the group consisting of: Zr, Gd, La, Sc, Sr, Co, Cr, Fe, Mn, V, Ti, Cu and Ni; N is one or more members of the group consisting of: Pt, Pd, and Au; n is a weight percent between 0 and 25; x, y and z are independently 0 to 0.9; x+y+z is 0.1 to 0.9; and δ is a number which renders the composition charge neutral; or $nN/(MO_x)_y(CeO_{2-\delta})_{1-y}$, where M is one or more members of the group selected from: Zr, Co, Cr, Fe, Mn, V, Ti, Ni and Cu; N is one or more members of the group selected from: Pt, Pd, and Au; n is a weight percent between 0 and 25; y is 0.1 to 0.9; and x and δ make the compositions charge neutral.

18 Claims, 6 Drawing Sheets

OTHER PUBLICATIONS

Hoflund, G. B. et al., "Au/MnO$_x$, catalytic performance characteristics for low–temperature carbon monoxide oxidation," (1995) *Appl. Catal. B: Envir.* 6:117–126.

Hoflund, G. B. et al., "Effect of CO$_2$ on the performance of Au/MnO$_x$ and Pt/SnO$_x$ low–temperature CO oxidation catalysts," (1995) *Langmuir*, 11:3431–3434.

Hoflund, G. B. et al., "Influence of an Fe promoter on silica–supported Pt/SnO$_x$ catalysts used for low–temperature CO oxidation," (1995) *Catal. Lett.*, 31:133–141.

Kahlich, M. et al. *Kinetics of the selective CO oxidation in H2–rich gas streams on supported noble metal catalysts* in *New Materials for Fuel Cell and Modern Battery Systems II*, Savadogo O. Ed., Ecole Polytechnique: Montreal, 1997.

Oh, S. H. and Sinkevitch R. M., "Carbon monoxide removal from hydrogen–rich fuel cell feedstreams by selective catalytic oxidation, " (1993) *J. Catal.* 142:254–262.

Sekizawa, K. et al., "Selective removal of CO in methanol reformed gas over Cu–supported mixed metal oxides," (May 1998) *Appl. Cat. A.: Gen.* 169:291–297.

Stark, D. S. and Harris, M. R., "Catalysed recombination of CO and O$_2$ in sealed CO$_2$ TEA laser gases at temperatures down to –27° C," (1983) *J. Phys. E: Sci. Instrum.* 16:492–496.

Tschope, A. et al., "Redox Activity of Nonstoichiometric Cerium Oxide–Based Nanocrystalline Catalysts," (1995) *J. Catalysis* 157:42–50.

Vidal, H. et al., "Influence of high temperature treatments under net oxidizing and reducing conditions on the oxygen storage and buffering properties of a Ce$_{0.68}$Zr$_{0.32}$O$_2$ mixed oxide," (Nov. 1999) *Catal. Today*, 54:93–100.

* cited by examiner

SELECTIVE REMOVAL OF CARBON MONOXIDE

CROSS REFERENCE TO RELATED APPLICATIONS

This application is a continuation-in-part of U.S. Ser. No. 09/468,034, filed Dec. 20, 1999 now U.S. Pat. No. 6,458,741, which is hereby incorporated by reference in its entirety to the extent not inconsistent with the disclosure herewith. This application also claims priority to U.S. Provisional Application Ser. No. 60/244,049, filed Oct. 27, 2000, which is hereby incorporated by reference in its entirety to the extent not inconsistent with the disclosure herewith.

STATEMENT REGARDING FEDERALLY SPONSORED RESEARCH OR DEVELOPMENT

This invention was made with Government support under Contract No. F33615-98-C-5124 awarded by the Department of the Air Force. The Government has certain rights in the invention.

BACKGROUND OF THE INVENTION

Hydrogen powered polymer electrolyte membrane fuel cells (PEMFCs) are useful for power generation due to their high efficiency and power density, low emissions, low operating temperature, small size, and portability. Because of these characteristics, hydrogen PEMFCs are being developed for both mobile and stationary applications. Natural gas or methanol are more practical fuels than hydrogen for commercial devices because of storage and transportation issues. If natural gas or methanol is used as fuel sources for PEMFCs, a reforming step is first used to convert the fuel to hydrogen prior to entering the cell. Unfortunately, the carbon monoxide which is produced along with hydrogen in the reforming step degrades PEMFC performance.

The vast majority of published work addressing the catalytic oxidation of CO has not considered selectivity in the presence of hydrogen. In the early 1980s, Stark et al. reported that Pt supported on $SnO_x$ was an effective CO oxidation catalyst. Hoflund et al. also studied the $Pt/SnO_x$ system and compared it to $Au/MnO_x$. They reported that $Au/MnO_x$ was more active and had a longer lifetime than $Pt/SnO_x$. The most significant results reported were that the $Au/MnO_x$ catalyst produced nearly 60% conversion of CO to $CO_2$ at only 35° C. and increasing the temperature to 55° C. produced over 80% conversion to $CO_2$. Haruta et al. also have performed extensive testing on supported Au catalysts for oxidation of $CO_2$. Using ultra-fine gold particles dispersed on the oxides of Fe, Co and Ni, they reported activity for the oxidation of CO at only −70° C. Since Au alone is known to be inactive towards oxidation, and the metal oxides used in the above studies have very limited activity, the results obtained by Hoflund et al. and Haruta et al. underscore the synergistic effects between the metal and support material.

The catalytic properties of Ce-based catalysts also have been studied. $CeO_2$ without any dopants or supported metals has been shown to be active for oxidation of CO with light-off temperatures above 300° C. By adding La to promote oxygen vacancies, and a small quantity of Cu (1 at. %), either as bulk CuO or incorporated into the structure, the light-off temperatures for CO oxidation were reported to be reduced to less than 100° C. Strong interactions between transition metal dopants and metal oxides are believed to be largely responsible for the enhancement in catalytic activity. Active sites formed by highly dispersed clusters of transition metal atoms and ions may promote oxidation at the phase boundary between the cluster and the metal oxide.

Selective CO oxidation in the presence of $H_2$ has not been as thoroughly investigated as low-temperature oxidation activity. Oh and Sinkevitch studied performance for noble metals (Ru, Rh, Pt) supported on $Al_2O_3$. At high temperatures (~170° C.) $Ru/Al_2O_3$ and $Rh/Al_2O_3$ were reported to demonstrate nearly 100% conversion of CO with approximately 5% conversion of $H_2$ for optimum inlet $O_2$ concentrations. These results were superior to those reported for $Pt/Al_2O_3$, which was reported to produce almost 20% conversion of $H_2$ with 100% conversion of CO. At lower temperatures (~140° C.) the better reported performance of Ru and Rh relative to Pt was even more pronounced, and Ru was significantly more selective than Rh. Kahlich et al. observed a similar trend between $Ru/Al_2O_3$ and $Pt/Al_2O_3$; however, the authors reported that $Au/Fe_2O_3$ generated comparable activities and selectivities at temperatures 70° C. lower. Haruta et al. also noted high activity of $Au/Fe_2O_3$, as well as Au supported on $Co_3O_4$, NiO, $Be(OH)_2$, and $Mg(OH)_2$. Moreover, the authors reported that Au supported on selected metal oxides was more selective for CO oxidation relative to $H_2$ than Pt and Pd catalysts. Furthermore, Bethke and Kung recently reported that selectivity for CO oxidation could be improved by decreasing Au particle size, and the authors suggest that the optimal particle size is between 5–10 nm. Finally, Sekizawa et al. reported that the water-gas shift catalyst $Cu/Al_2O_3$—ZnO has promise for selective removal of CO from methanol reformate under appropriate conditions. Despite these apparent successes, current catalysts for selective CO oxidation lack sufficient activity and selectivity at temperatures compatible with PEMFCs (i.e., around 90–110° C.) and require careful control of $O_2$ concentration in the feed for optimum performance.

Methods for removal of carbon monoxide from hydrogen fuel include adsorption, reduction and oxidation. Adsorption methods remove carbon monoxide by trapping it on a suitable substrate. Although this method is effective, a portion of the purified hydrogen stream must be used as a sweep gas to regenerate the adsorbent, which decreases the amount of fuel available for the cell. Furthermore, large quantities of adsorbent are needed and heat must be applied to the adsorbent to liberate carbon monoxide during regeneration. Alternatively, carbon monoxide can be removed by catalytic reduction to methane. Unfortunately, catalysts that promote this reaction also promote undesirable side reactions that result in generation of more carbon monoxide.

There is a need for catalysts which selectively remove CO from hydrogen-containing gases. One particular use for such catalysts is to remove CO from a reformate gas feedstream with minimal reduction in hydrogen content.

SUMMARY OF THE INVENTION

The catalysts in this invention are multi-component metal oxides with or without noble metals. These catalysts are useful to selectively remove carbon monoxide in the presence of hydrogen. The hydrogen may be present in a large excess. One specific application of the materials of the invention is improving fuel quality for hydrogen PEMFCs.

Catalysts described in this invention are believed to remove carbon monoxide by selectively oxidizing it to carbon dioxide. Carbon dioxide does not affect the performance of hydrogen PEMFCs. Furthermore, the catalysts described in this invention are distinct from other reported selective carbon monoxide oxidation catalysts since they do not rely on noble metals or metals supported on traditional carriers such as $Al_2O_3$. Some significant and distinct aspects of catalysts in this invention are that they are multi-component metal oxides tailored to give selective oxidation of carbon monoxide in the presence of hydrogen, including a large excess of hydrogen, and the compositions do not require expensive noble metals to be effective.

This invention relates to the composition, synthesis, and use of distinct metal oxide catalysts either with or without catalytic noble metals for selective oxidation of carbon monoxide in the presence of hydrogen.

The preferred catalyst compositions of the invention have the formula:

$$nN/Ce_{1-(x+y+z)}A_xA'_yA''_zO_{2-\delta}$$

where A, A', A'' are independently selected from the group consisting of: Zr, Gd, La, Sc, Sr, Co, Cr, Fe, Mn, V, Ti, Cu and Ni; N is one or more members of the group consisting of Pt, Pd and Au;

n is a weight percent between 0 and 25;

x, y and z are independently 0 to 0.9;

x+y+z is 0.1 to 0.9; and

δ is a number which renders the composition charge neutral. These catalyst compositions are also useful in the methods of the invention.

Other preferred catalyst compositions of the invention have the formula:

$$nN/(MO_x)_y(CeO_{2-\delta})_{1-y},$$

where

M is one or more members of the group selected from: Zr, Co, Cr, Fe, Mn, V, Ti, Ni and Cu; N is one or more members of the group consisting of Pt, Pd and Au;

n is a weight percent between 0 and 25;

y is 0.1 to 0.9;

and x and δ make the compositions charge neutral. These catalyst compositions are also useful in the methods of the invention.

Catalyst compositions of the invention may comprise mixed oxides, single-phase materials, or multi-phase materials. Catalyst compositions further comprising a supporting material are also provided and are useful in the methods of the invention.

One class of compounds useful in the methods of the invention for selective removal of carbon monoxide in a hydrogen containing gas comprises Ce and at least one of ((a) or (b)) where (a) is one or more second metals selected from the group consisting of: Zr, Gd, La, Sc, and Sr; (b) is one or more third metals selected from the group consisting of: Co, Cr, Fe, Mn, V, Ti, Cu and Ni.

Another class of compositions useful in the methods of the invention are catalyst compositions with the formula:

$$nN/Ce_{1-x}Zr_cA_aA'_{a'}A''_{a''}B_bB'_{b'}B''_{b''}O_{2-\delta}$$

wherein n is a weight percentage from 0 to 25; N is one or more metals selected from the group consisting of Au, Pt, and Pd; x=a+a'+a''+b+b'+b''+c; a, a', a'', b, b', b'' and c are each, independently of one another, 0 to 0.9; δ is a number which renders the composition charge neutral; A, A' and A'' are independently selected from the group consisting of Gd, La, Sr and Sc; B, B' and B'' are independently selected from the group consisting of Ti, V, Mn, Fe, Co, Cr, Ni, Au, Ag and Cu; provided that at least one of a, a', a'', b, b', b'' or c is nonzero.

In this class of compounds, preferably n is a weight percentage from 0 to 10, more preferably, n is a percentage from 0 to 5, and most preferably, n is a percentage from 0 to 3. In this class of compounds, preferably A, A' and A'' are selected from the group consisting of Gd, La and Sr. In this class of compounds, preferably B, B' and B'' are selected from the group consisting of Mn, Cu, Fe, Co and Cr. Preferably, c is between 0 to 0.2. Preferably, a+a'+a'' is between 0 and 0.1. Preferably b+b'+b'' is between 0.05 and 0.5.

Another class of compounds useful in the methods of the invention are those having formula:

$$nN/Ce_{1-x}Zr_cA_aA'_{a'}B_bB'_{b'}O_{2-\delta}$$

wherein n is a weight percentage from 0.01 to 15; N is one or more metals selected from the group consisting of Pt, Pd, and Au; x=a+a'+b+b'+c; a, a', b, b' and c are each, independently of one another, 0 to 0.5; δ is a number which renders the composition charge neutral; A and A' are independently selected from the group consisting of Gd, La, Sr and Sc; B and B' are independently selected from the group consisting of Ti, V, Mn, Fe, Co, Cr, Ni, Au, Ag and Cu; provided that at least one of a, a', b, b' or c is nonzero.

In this class of compounds, preferably n is a percentage from 0.01 to 10, more preferably, n is a percentage from 0.01 to 5, and most preferably, n is a percentage from 0.01 to 3. In this class of compounds, preferably A and A' are one or more of Gd, La and Sr, and preferably B and B' are one or more of Mn, Cu, Co, Cr and Fe.

Another class of compounds useful in the methods of this invention include those having formula:

$$nN/m\ Ce_{1-x}A_aA'_{a'}B_bB'_{b'}O_{2-\delta}/Zr_{1-z}A''_{a''}A'''_{a'''}B''_{b''}B'''_{b'''}O_{2-\delta}$$

wherein n is a percentage from 0 to 15; m is a percentage greater than 0; N is one or more metals selected from the group consisting of Pt, Pd, and Au; x=a+a'+b+b'; z=a''+a'''+b''+b'''; a, a', a'', a''', b, b', b'' and b''' are each, independently of one another, 0 to 0.5; δ is a number which renders the composition charge neutral; A, A', A'' and A''' are independently selected from the group consisting of Gd, La, Sr and Sc; B, B', B'' and B''' are independently selected from the group consisting of Ti, V, Mn, Fe, Co, Cr, Ni, Au, Ag and Cu; provided that at least one of a, a', a'', a''', b, b', b'' or b''' is nonzero.

In this class of compounds, preferably n is a percentage from 0 to 10, more preferably, n is a percentage from 0 to 5, and most preferably, n is a percentage from 0 to 3. Preferably m is a percentage from 0.5 to 25. In this class of compounds, preferably A, A', A'' and A''' are independently selected from the group consisting of Gd, La and Sr, and B, B', B'' and B''' are independently selected from the group consisting of Mn, Cu, Co, Cr and Fe.

Another class of compounds useful in the methods of this invention include those having formula:

$$nN/m(CeO_2)/p(A_aA'_{a'}A''_{a''}B_bB'_{b'}B''_{b''}O_{2-\delta})/q(A'''_{a'''}A''''_{a''''}A'''''_{a'''''}B'''_{b'''}B''''_{b''''}B'''''_{b'''''}O_{2-\delta})$$

wherein n, p and q are percentages from 0 to 50; m is a percentage greater than 0; N is one or more metals selected from the group consisting of Au, Pt and Pd; a, a', a'', a''', a'''', a''''', b, b', b'', b''', b'''' and b''''' are each, independently of one another, 0 or 1; 67 is a number which renders the composition charge neutral; A, A', A'', A''', A'''' and A''''' are independently selected from the group consisting of Gd, La, Sr and Sc; B, B', B'', B''', B'''' and B''''' are independently selected from the group consisting of Ti, V, Mn, Fe, Co, Cr, Ni, Au, Ag and Cu; provided that when n is zero, at least one of p and q is nonzero and at least one of a, a', a", a'",a"", a'"", b, b', b", b'", b"" and b'"" is nonzero.

In this class of compounds, A, A', A", A'", A"" and A'"" are preferably Gd, La and Sr, and B, B', B", B'", B"" and B'"" are preferably Mn, Cu, Co, Cr and Fe. Preferably, p and q are less than 50%. Preferably m is 10% to 50%. Preferably n is 5% or less.

More preferred catalysts of the invention include those having constituents with a preference for carbon monoxide. Such constituents include: copper, manganese and gold. Particularly useful materials include finely dispersed Au or Cu within composite metal oxides. Activity is promoted by high dispersion of these metals and synergy with the composite metal oxide support. Selectivity is achieved through preferential interaction of CO with polarizable Cu clusters and Au particles, as well as stabilized surface Cu ions. One class of compounds of the invention contains finely dispersed Au within composite metal oxides. Another class of compounds of the invention includes finely dispersed Cu within composite metal oxides. Useful catalysts of the invention include: $Ce_{0.5}Cu_{0.5}O_w$; $Ce_{0.475}Zr_{0.05}Mn_{0.475}O_w$; $Ce_{0.05}Mn_{0.05}O_w$; $Ce_{0.45}Zr_{0.05}Mn_{0.45}Cu_{0.05}O_w$; and $Ce_{0.5}Fe_{0.1}Cu_{0.4}O_w$. Other useful catalysts of the invention include: $Mn_{0.5}Fe_{0.5}O_w$; $Ce_{0.1}Mn_{0.45}Cu_{0.45}O_w$; $Ce_{0.1}Mn_{0.45}Fe_{0.45}O_w$; $Ce_{0.3}Mn_{0.7}O_w$; and $Ce_{0.3}Mn_{0.65}Zr_{0.05}O_w$. δ and w are values which depend on the crystal structure of the composition, as known in the art and make the composition charge neutral. One class of compounds of the invention contains cerium at less than about 50 atomic percent of the metal components. Another class of compounds of the invention contains cerium at more than about 50 atomic percent of the metal components. Another class of compounds of the invention contains cerium at about 50 atomic percent of the metal components. Another class of compounds of the invention contains cerium at less than about 40 atomic percent of the metal components. Another class of compounds contains between 1–35 atomic percent $CeO_2$. Another class of compounds of the invention contains cerium at less than about 30 atomic percent of the metal components. Another class of compounds of the invention contains cerium at less than about 25 atomic percent of the metal components. Another class of compounds of the invention contains cerium at less than about 65 atomic percent of the metal components. All intermediate ranges of cerium are included in the invention, as long as the compositions selectively remove carbon monoxide in the presence of hydrogen. Another class of compounds includes any composition of the invention with a low weight fraction of highly-dispersed gold, preferably less than 5 wt %, and more preferably less than about 1 wt %.

Also provided are methods for selectively removing carbon monoxide in a hydrogen-containing gas which comprise the step of contacting said gas with a catalyst composition of the invention. These methods may further comprise heating either said gas or said catalyst composition, or both, to a temperature sufficient remove the desired amount of carbon monoxide in said gas. The catalyst compositions may be held in a reactor at temperatures of from about ambient temperature to about 250° C. Preferably, the temperatures are from about ambient temperature to about 150° C. Preferably, temperatures from about 150° C. to about 30° C. are used. Most preferably, temperatures of about 120° C. and below are used.

Catalyst compositions useful in the methods of the invention include those with a surface area ranging from about 20 to about 220 m²/g.

The catalyst compositions useful in the methods of the invention may be prepared by methods known in the art, or the methods described herein or modifications of methods known in the art or modifications of the methods described herein. The catalysts described in this invention can be prepared by coprecipitation, impregnation, precipitation deposition, ceramic processing, or hydrothermal processing techniques, or other methods known in the art.

Catalyst compositions of the invention include those with predominantly fluorite crystal structures. Other structures that may be present include defect fluorite, pyrochlore ($A_2B_2O_7$) and perovskite-like phases, or phases resulting from other metal oxides in the catalyst such as oxides of Cu, Mn, Cr and Co. Cerium and zirconium oxide with some amount of dopants are generally present as fluorite structures. Dopants may also be present as oxides. A class of catalyst compositions of the invention are those that do not require an inert support, such as alumina or carbon. Another class of catalyst compositions of the invention include a support material such as a honeycomb matrix having inner and outer surfaces, wherein said catalyst material is present on the inner surfaces of said honeycomb matrix. Preferably, the support material is fabricated from ceramic materials, but may also be fabricated from metals or ceramic or metal fibers.

The catalyst compositions may be coated onto the support material by any method which produces a suitable coating of catalyst composition, including the method of: (a) treating a mixture of metal salt precursors with a precipitating reagent to form a precipitate; (b) preparing a slurry of said precipitate; (c) coating said slurry onto said support; and (d) calcining said slurry. The catalyst compositions may also be coated onto a support material by: (a) mixing a solution of metal salt precursors with the support; and (b) calcining said precursors. The catalyst compositions may also be coated onto said support material by: (a) mixing the support with one or more metal salt precursors to form a mixture; (b) treating said mixture with a precipitating reagent to form a precipitate; and (c) calcining said precipitate.

Also provided are methods of selectively removing carbon monoxide in a hydrogen-containing gas, comprising the steps of providing a reactor containing a catalyst composition of the invention; and passing the gas through the reactor to remove the carbon monoxide. Also provided is a catalytic reactor for selectively removing carbon monoxide from a hydrogen-containing gas which comprises: a casing having an entrance port, an exit port and a passage therebetween for the movement of said gases from said entrance port to said exit port with a catalyst composition of the invention in said passage. In the catalytic reactor, the gases preferably contact said catalyst before exiting said casing.

As used herein, "catalyst composition" includes those compositions useful for selective removal of carbon monoxide in a hydrogen-containing gas. As used herein, "mixed metal oxides" include one or more metal oxides. As used herein, "single-phase material" is a material that comprises a single crystallographic phase. As used herein, "multi-phase material" refers to a material wherein some components are single-phase and other components are mixed metal oxides. As used herein, a "precipitating reagent" is a substance or mixture of substances that causes precipitation of a desired substance. Preferred precipitating reagents include $NH_4OH$, $(NH_4)_2CO_3$, $Na_2CO_3$, $NaOH$, urea and $K_2CO_3$. As used herein, "contacting" substances is meant to indicate that substances are physically near each other, but is not intended to mean a homogeneous solution is formed.

The catalysts of this invention are suitable for use in any reactor system and particularly with either fixed and fluid bed reactors and can be prepared as powders or pressed into plugs, pellets and other shapes suitable for use in a given reactor configuration.

The catalyst compositions of the invention may be used to reduce the concentration of carbon monoxide in a gas mixture. The components of the gas mixture may include methane, carbon dioxide, carbon monoxide, oxygen, water, nitrogen, argon, native components of air, hydrogen and other hydrocarbons, or any mixture of the foregoing. The gas may also include other substances, as known in the art, for example other components of a fuel cell feed. The gas mixture must contain some oxygen, preferably not a large excess of oxygen. The gas mixture preferably contains a stoichiometric amount of oxygen. The catalysts of the invention function in the presence of potentially interfering substances, such as water, sulfur-containing gases and halogens.

The catalysts are preferably preconditioned prior to said gases contacting said catalyst. The preconditioning treatment is useful to desorb moisture and change the oxidation state of some species. More preferably, the catalysts are preconditioned at a temperature of between about 150° C. to 400° C. Catalyst compositions of the invention are preferably preconditioned under a flow of air for a time sufficient to maximize activity, preferably for one hour or more. The preferred preconditioning time is longer at lower temperatures and can be as long as 24 hours at temperatures of 100° C. or less.

Catalysts of the invention have long lifetimes and can be regenerated by heating for a sufficient time to drive off adsorbed organics and moisture. For example, catalysts of the invention may be regenerated by heating at a temperature of about 150° C.

The catalysts can contain between 0 and 25 weight percent of Pt, Pd and Au, or combinations of these metals and any intermediate value therein. Preferably, the amount of Pt, Pd and Au is as small as possible, because the metals are expensive. Preferably, less than about 10 weight percent of these metals are present. If present, Pt and Au are in the metallic state and Pd can be in the metallic state or as an oxide.

Figure 2:
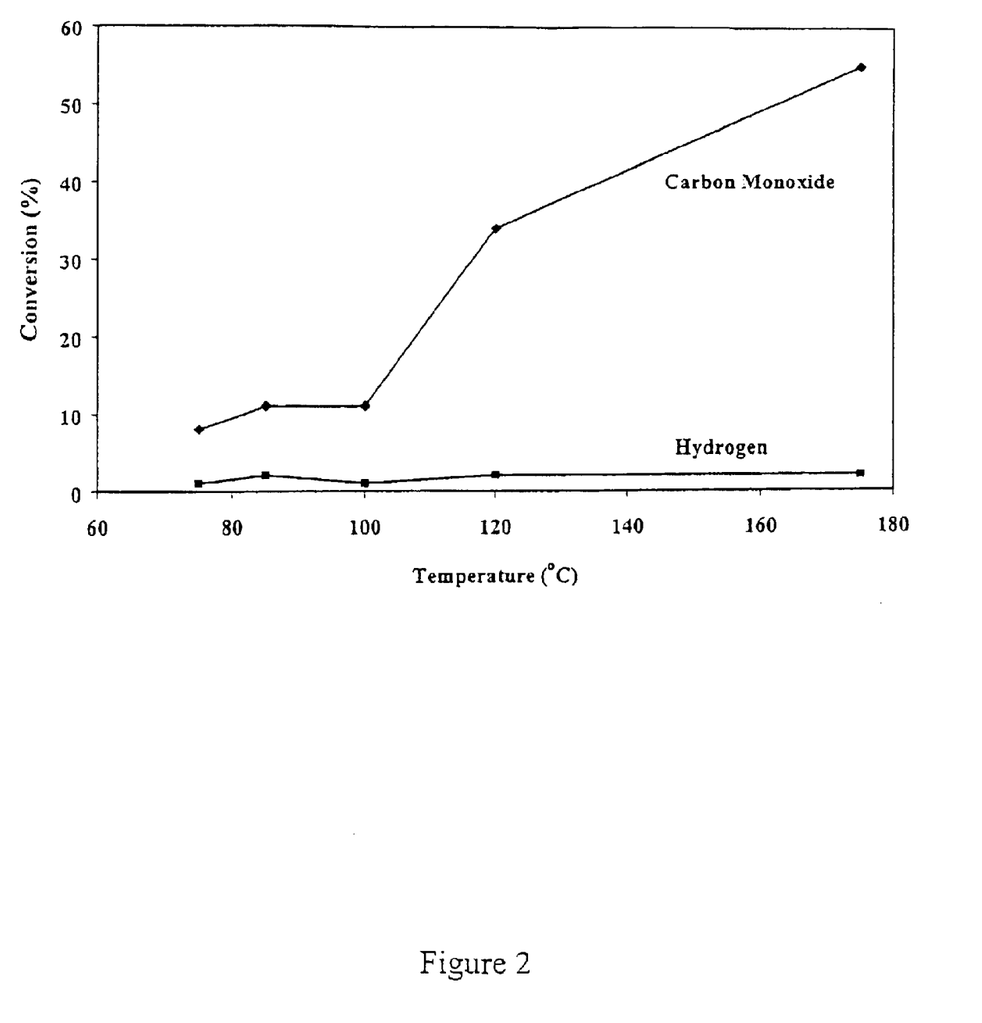
FIG. 2 is a plot showing selective catalytic oxidation of carbon monoxide in the presence of hydrogen. Percent conversion represents oxidation of carbon monoxide to carbon dioxide and oxidation of hydrogen to water. The catalyst was $Ce_{0.475}Zr_{0.05}Mn_{0.475}O_w$ and the space velocity was ~24,000 hr$^{-1}$. The average reactor inlet concentrations were 0.15 vol. % CO, 2.5 vol. % for $H_2$, and approximately 0.2 vol. % $O_2$ with a balance of Ar.
Figure 3:
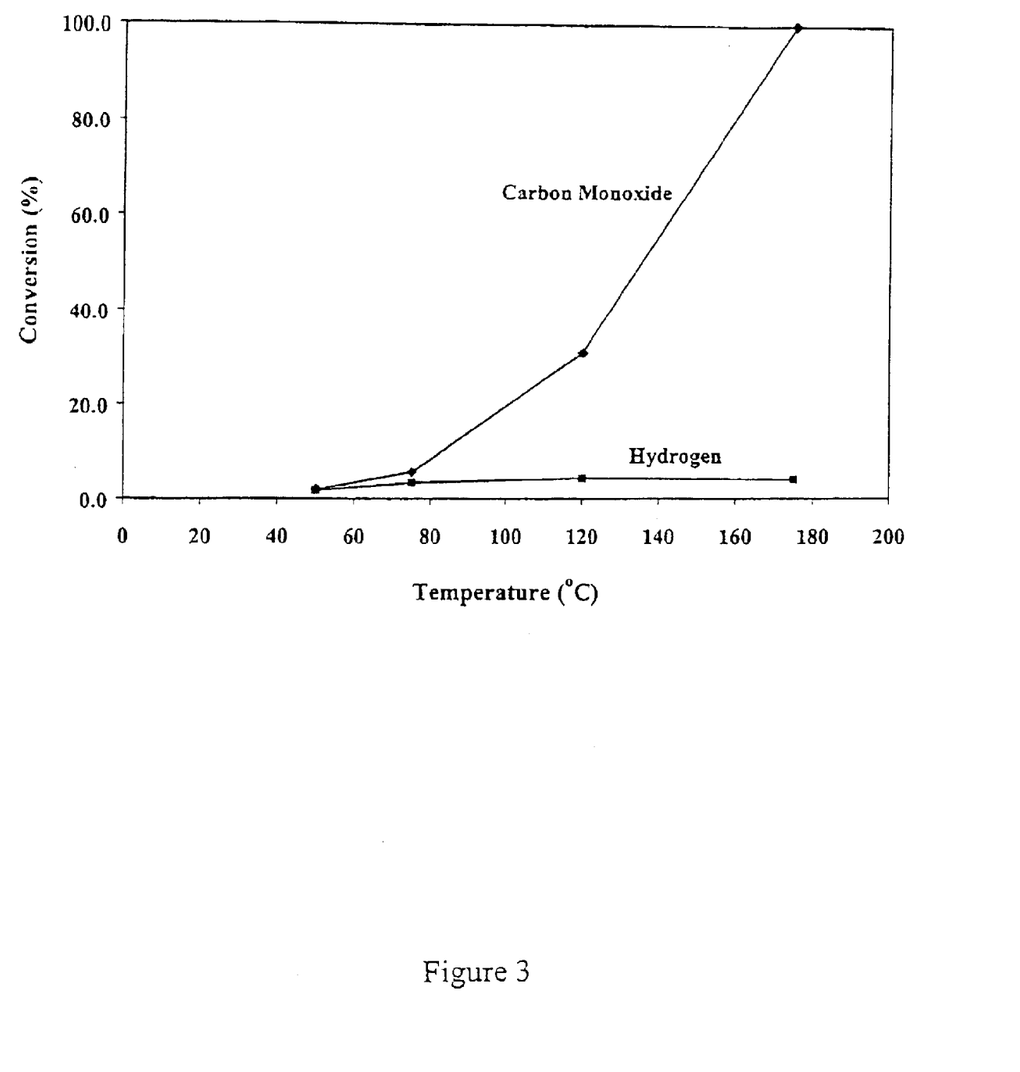
FIG. 3 is a plot showing selective catalytic oxidation of carbon monoxide in the presence of hydrogen. Percent conversion represents oxidation of carbon monoxide to carbon dioxide and oxidation of hydrogen to water. The catalyst was $Ce_{0.45}Zr_{0.05}Mn_{0.45}Cu_{0.05}O_w$ and the space velocity was ~24,000 hr$^{-1}$. The average reactor inlet concentrations were 0.3 vol. % CO, 2 vol. % for $H_2$, and approximately 0.3 vol. % $O_2$ with a balance of Ar.
Figure 4:
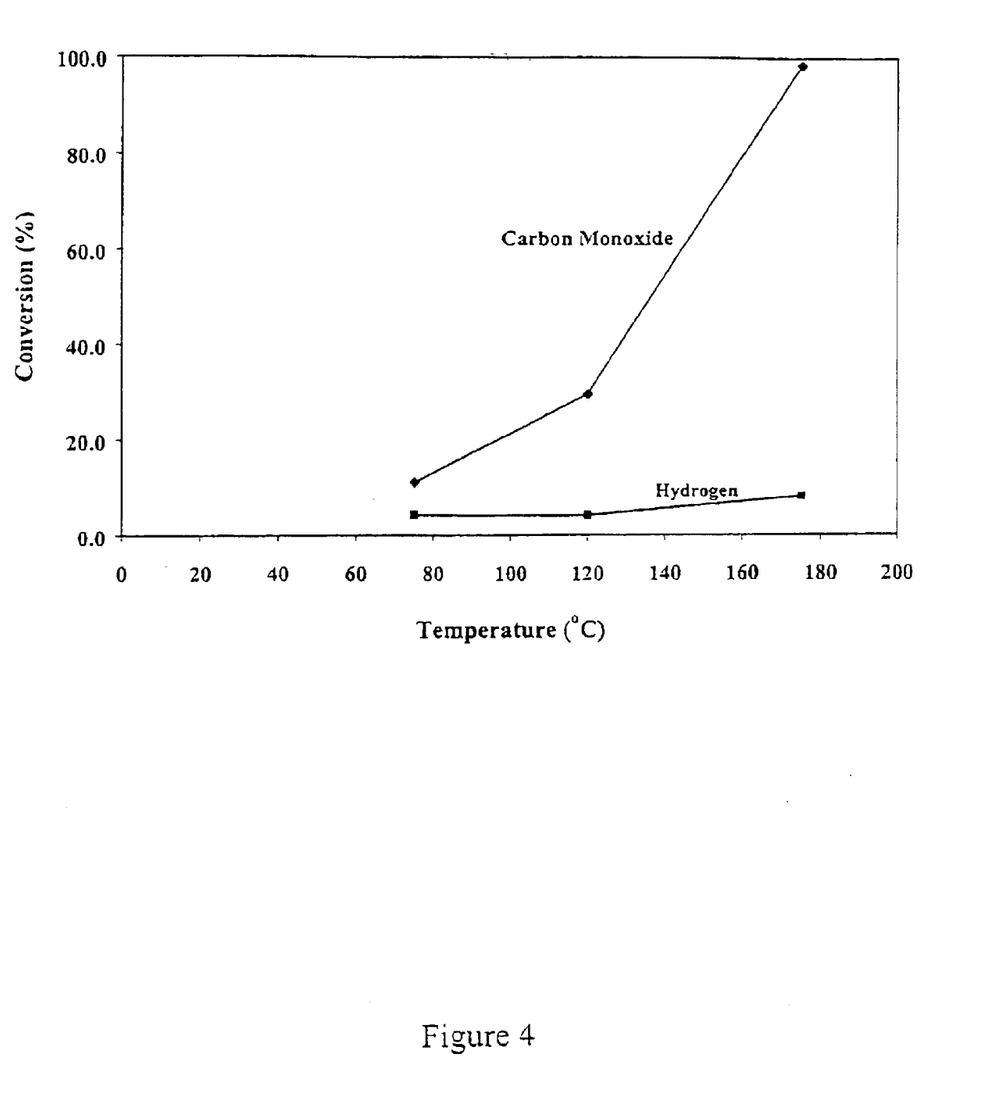
FIG. 4 is a plot showing selective catalytic oxidation of carbon monoxide in the presence of hydrogen. Percent conversion represents oxidation of carbon monoxide to carbon dioxide and oxidation of hydrogen to water. The catalyst was $Ce_{0.5}Mn_{0.5}O_w$ and the space velocity was ~24,000 hr$^{-1}$. The average reactor inlet concentrations were 0.1 vol. % CO, 1 vol. % for $H_2$, and approximately 0.1 vol. % $O_2$ with a balance of Ar.
Figure 5:
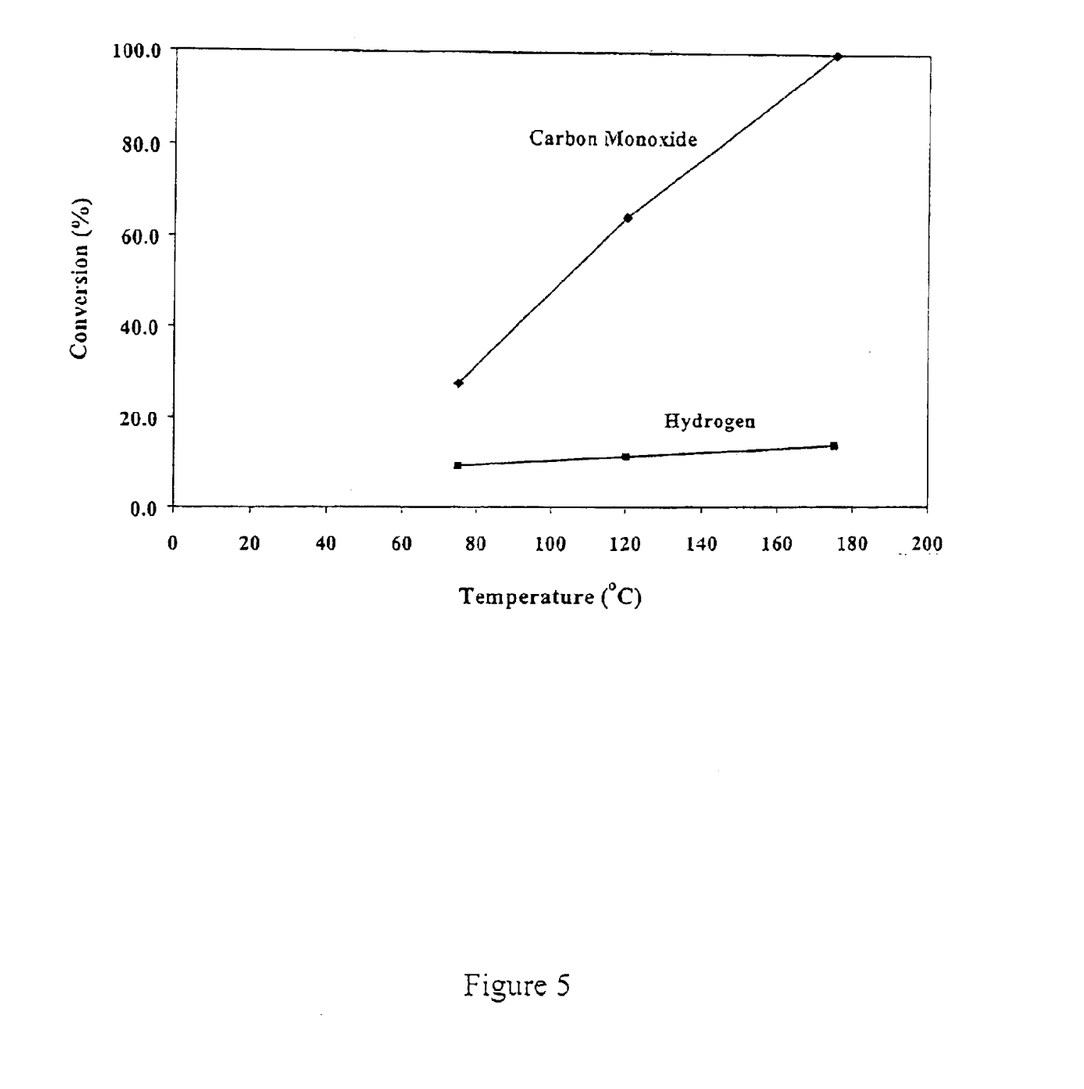
FIG. 5 is a plot showing selective catalytic oxidation of carbon monoxide in the presence of hydrogen. Percent conversion represents oxidation of carbon monoxide to carbon dioxide and oxidation of hydrogen to water. The catalyst was $Ce_{0.475}Zr_{0.05}Mn_{0.475}O_{2w}$ and the space velocity was ~24,000 hr$^{-1}$. The average reactor inlet concentrations were 0.1 vol. % CO, 1 vol. % for $H_2$, and approximately 0.1 vol. % $O_2$ with a balance of Ar.

As used herein, "selective removal of carbon monoxide in the presence of hydrogen" means that more carbon monoxide is removed from a gas than hydrogen is removed. It is preferred that as much carbon monoxide is removed as possible, while the level of hydrogen is maintained to as great an extent as possible. The carbon monoxide does not need to be all removed for the removal to be encompassed by the term, as long as the carbon monoxide is reduced more than the hydrogen is reduced. The desired amount of carbon monoxide which is removed is dependent on the particular application of the catalyst or method. The amount of carbon monoxide which is removed is dependent on the temperature of the reaction, the catalyst composition, the flow rates, the composition of the inlet stream, and other parameters as known in the art. One particular example of selective removal is shown in FIG. 2. In some applications, it is preferred that the concentration of carbon monoxide be removed to less than 10 ppm in the gas mixture. All catalyst compositions of this invention are useful to selectively remove carbon monoxide from a hydrogen-containing gas.

DETAILED DESCRIPTION OF THE INVENTION

One application for the materials and methods described herein is selective removal of carbon monoxide from reformate fuel for hydrogen powered polymer electrolyte membrane fuel cells (PEMFC). Since even low levels of carbon monoxide can degrade hydrogen PEMFC performance, use of these catalysts will improve fuel cell operation when using fuel sources other than pure hydrogen.

The specific components of these catalysts listed above can be separated into four categories. The first category includes Ce, either as $CeO_2$ or doped $CeO_2$. This component acts both as a support in synergy with noble metals and an active metal oxide oxidation catalyst. An equilibrium between $Ce^{3+}$ and $Ce^{4+}$ results in an exceptionally high oxygen storage and release capacity that facilitates catalytic combustion by providing oxygen directly to catalytically active sites. Furthermore, $CeO_2$-containing catalysts are less susceptible to deactivation from water vapor and more resistant to sintering than catalysts employing inactive metal oxide supports such as $Al_2O_3$. The second category includes Zr, Gd, La, Sc and Sr. Doping $CeO_2$ with $Zr^{4+}$ is believed to create defects in the fluorite oxygen sublattice and results in an increase in oxygen mobility and diffusivity. Furthermore, small quantities of Gd, La, Sc and Sr in the composition are believed to produce mobile oxygen vacancies that take part in the catalytic combustion mechanism. The third category of additives imparts a more substantial effect on the catalyst qualities and includes the transition metals Co, Cr, Fe, Mn, V, Ti, Cu and Ni. In addition to lowering the temperature of the $Ce^{4+}$-$Ce^{3+}$ redox couple, most of these metals have multiple oxidation states and metal oxygen bond strengths conducive to oxidation reactions. Accordingly, when combined with $CeO_2$, they also act in synergy to provide additional catalytic active sites and increase oxygen mobility as well as reactive surface oxygen species. The fourth category includes the noble metals Pt, Pd and Au. Both Pt and Au are present in the metallic state whereas Pd can be present as a metal or an oxide. Although inclusion of this fourth category in catalyst compositions improves catalyst oxidation activity, it is not necessary and is deemphasized due to the high cost of these metals. High oxidation activity of these materials results from judicious selection of specific compositions. The compositions are selected based on the qualities described above, as well as results of catalyst testing, such as that described herein, or known in the art. However, catalyst activity must be balanced with selectivity for preferential interaction of CO with catalyst active sites.

One class of catalysts consist of finely dispersed Au and/or Cu on nanocrystalline multi-component metal oxides. For Cu-containing analogs, the Cu is believed to be present as groups of atoms forming clusters, or stabilized surface Cu ions. The composite catalyst can be denoted by the general formula $M_x(M'O_y)_z(CeO_{2-\delta})_{1-(x+z)}$, where M represents particles or clusters of Cu or Au, M' is a transition metal oxide or mixtures of transition metal oxides selected from Zr, Co, Cr, Fe, Mn, V, Ti, Ni, and Cu, and $0.5 \leq (x+z) \leq 1$.

Proposed Mechanism. Although Applicants do not wish to be bound by theory, and the mechanism for selective oxidation of carbon monoxide on these materials is not known, it is believed that the first step involves adsorption of oxygen from the feedstream onto a surface metal. cation to form a superoxide ($O_2^-$). The superoxide likely converts to a peroxide species ($O_2^{2-}$), which has been suggested to be the active form of surface oxygen for similar materials. The peroxide ion may associate with two reduced-state metal cations or an oxygen vacancy. Simultaneously, carbon monoxide can selectively adsorb from the feedstream to a metal particle, cluster, or ion, and migrate to the three-phase boundary between the specific active site, metal oxide surface, and gas phase. At this three-phase boundary, reaction with $O_2^{2-}$ can occur to produce $CO_2$. This process will remove deleterious carbon monoxide from the reformate fuel without combusting hydrogen.

Catalyst preparation. The coprecipitation method may be used to prepare catalysts. The coprecipitation method involves dissolution of metal salt precursors (typically nitrates) in the appropriate molar ratios in water and/or alcohol. The precursor solution is slowly mixed with a precipitating reagent (e.g., $NH_4OH$, $NaOH$, $KOH$, $Na_2CO_3$) with constant stirring. The resulting precipitates are filtered and washed several times in distilled water. The washed precipitates are dried at ~100° C., followed by calcining in air between 300 and 850° C. for several hours. The resulting dried powder is ground and passed through a 150-$\mu$m sieve. To decrease particle size, the powder is thoroughly milled to nanometer dimensions using a Spex Certiprep 8000 Mixer/Mill. Other preparation methods may be used, also. Hydrothermal synthesis also involves precipitation of an oxide from precursor salts with a base; however, the reaction is carried out at temperatures between 120° C. and 180° C. in a sealed vessel. The hydrothermal process tends to produce ultra fine powders with a very narrow distribution of particle sizes and shapes. Ceramic processing is a solid state synthesis that requires physically mixing the constituent metal oxides followed by high-temperature calcination. This process eliminates problems associated with selective precipitation that might be encountered with coprecipitation; however, the high processing temperatures result in catalysts with much lower surface areas. Impregnation involves mixing a catalyst precursor solution with a powder prepared by one of the methods above. After removal of the solvent, the mixture is oxidized in an oven as appropriate.

Catalyst Calcination and Pretreatment. Catalysts are calcined in air prior to any additional treatment, and the calcination temperature and duration is used to adjust the crystallographic properties of the material as described above. In particular, the calcination temperature affects the ratio of surface metal to the metals in the bulk oxide, as well as the surface cluster size. However, for Cu-containing analogs reductive pretreatment is used to affect the nature of the Cu active sites. For example, Tschöpe et al. showed that after reduction of $Cu_{0.15}Ce_{0.85}O_{2-\delta}$ at 200° C., the Cu content was 100% $Cu^{+2}$. Increasing the reduction temperature to 300° C. divided the Cu content to 70% $Cu^+$ and 30% $Cu^0$, and reduction at 400° C. produced 100% $Cu^0$. Since $Cu^+$ has been suggested to be the active site for CO oxidation, low-temperature reduction is likely favored for similar systems. However, the above discussion only relates to activity for CO oxidation and not selectivity over $H_2$. Since high activity already is easy to achieve, improvements in selective CO oxidation will be gained through alternative treatments that enhance selectivity. Accordingly, promising catalyst compositions are tested after exposure to both oxidative and reductive conditions over the temperature range of 100° to 850° C.

Catalyst Characterization. The catalysts are characterized by methods known in the art, including i) scanning electron microscopy (SEM), ii) energy dispersive X-ray spectroscopy (EDX), iii) X-ray diffraction (XRD), iv) surface area and pore size analysis, v) particle size measurement, vi) metal dispersion, vii) Fourier-transform infrared spectroscopy (FTIR), and viii) atomic absorbance spectroscopy (AAS).

Figure 1:
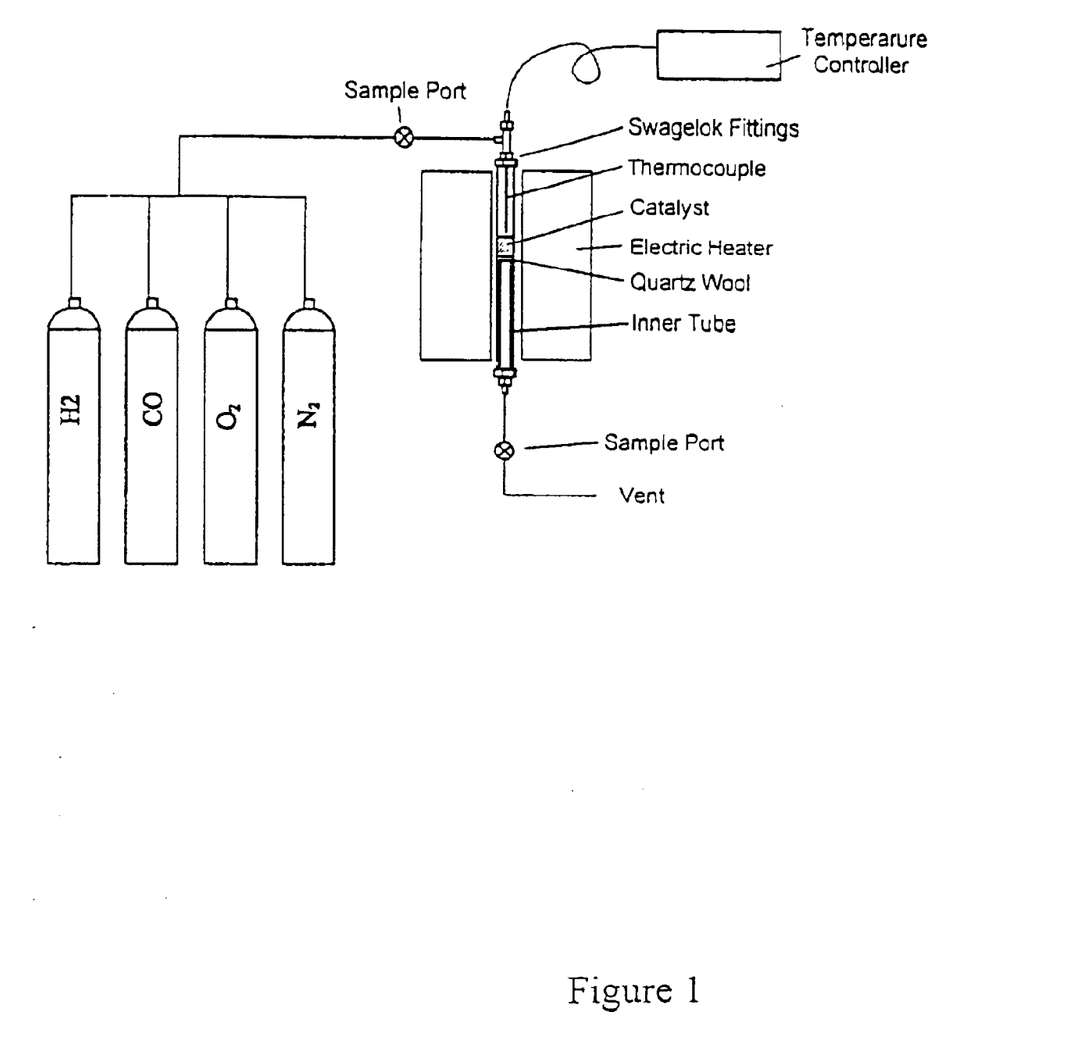
FIG. 1 shows a schematic diagram of a single reactor to be used for catalyst screening.

Catalyst Screening Apparatus. A schematic diagram of a single reactor to be used for catalyst screening is shown in FIG. 1. One actual catalyst screening apparatus in use incorporates six reactors, which enables rapid catalyst screening. Important components of the reactor include an electric furnace surrounding a 4-mm i.d. quartz tube containing the catalyst sample. The catalyst is held in place by a plug of quartz wool and a narrower inner-tube, and the temperature is monitored and adjusted using a controller paired with a thermocouple touching the top the catalyst bed. The quartz reactor tube is coupled to $\frac{1}{8}$" stainless steel inlet and outlet tubes using Swagelok fittings with Teflon ferrules. Simulant reformate fuel is prepared by mixing $H_2$, CO, and $O_2$ from cylinders with a balance of $N_2$ or Ar. Flow rates are controlled by needle valves and monitored using both ball-type and bubble flow meters. Sampling of the inlet and outlet gas stream is achieved through ports located on opposite sides of the reactor.

Catalyst Screening Conditions and Procedure. Approximately 0.2 g of catalyst is used for each evaluation, which corresponds to a cylindrical catalyst volume of ~0.13 $cm^3$. Catalysts are screened at temperatures between 50–200° C. and space velocities between 10,000–20,000 $hr^{-1}$ (contact times between 0.4–0.2 seconds), which requires flow rates between 20–40 mL/min.

The CO concentration in the feedstream is maintained at ~2000 ppm. To simulate $H_2$-rich reformate, the $H_2$ concentration is between 10,000–50,000 ppm. The $O_2$ concentration is a variable in catalyst performance evaluation, and ranges between 0–6,000 ppm. The concentrations of species in the inlet and outlet streams (i.e., CO, $H_2$, and $CO_2$) are determined by chromatographic analysis of 1-mL samples using a Hewlett-Packard 5890 GC with thermal-conductivity detection. Chromatographic separation is performed with an Alltech CTR-1 column, and peak areas are determined using a Hewlett-Packard 3396A integrator. Calibration is performed by measuring chromatographic peak area as a function of concentration over the relevant concentration ranges for each gas.

For each catalyst, activity and selectivity are determined over a range of temperatures for a fixed $O_2$ concentration approximately equal to the CO concentration. The temperature required for 50% and 100% CO oxidation is determined from the data, and the catalysts are screened at these temperatures for a variable $O_2$ concentration. Conversion values, % C, for CO are determined based on CO removal and $CO_2$ production according to, $$\% \ C = \frac{[CO_2]_{outlet}}{[CO]_{inlet}} (100) \quad (2)$$

and $$\% \ C = \frac{[CO]_{inlet} - [CO]_{outlet}}{[CO]_{inlet}} (100) \quad (1)$$

where $[CO]_{inlet}$, $[CO]_{outlet}$, and $[CO_2]_{outlet}$ are the inlet and outlet CO concentration, and the outlet $CO_2$ concentration, respectively. Consumption of $H_2$ is determined using an equation analogous to Equation 1. For each set of data, selectivity is highlighted by plotting % C versus $H_2$ consumption.

Examples of selective removal of carbon monoxide from a hydrogen-containing gas are shown in FIGS. 2–5.

Catalyst Optimization. Catalyst optimization is performed by careful variation of catalyst constituents and concentrations in the material, as well as preparation and pretreatment conditions. Optimization is also performed using statistical methods known in the art.

Catalyst compositions are also tested on traditional cordierite monolith and alumina pellet supports. The ceramic monoliths are obtained from commercial sources (Corning) and have a cell density of $400/in^2$. Alumina pellets also are obtained from commercial sources (Aldrich) and have a particle diameter of ~6 mm. Since the method of incorporating the catalysts onto the support structures is anticipated to have a dramatic effect on the resulting activity, several methods are investigated: i) slurry coating, ii) decomposition of precursors, and iii) deposition-precipitation. Each of these methods, as well as the procedures for evaluating structurally-supported catalysts, is described below.

Slurry Coating. Catalyst powder slurries are prepared by mixing approximately 2 g of 0.2 to 2-μm catalyst powder in 1,4-butanediol. The 1,4-butanediol has sufficient viscosity to maintain suspension of the catalyst particles, while allowing thorough coating of the support surface. The uncoated support is immersed in the slurry, then removed and dried at ~100° C. for 12 hours, followed by calcining in air for 2 hours at temperatures between 200 and 900° C. As with the powder catalysts, exact calcination temperatures and pretreatment conditions are determined experimentally, and depend on the specific catalyst being used. To obtain the desired loading, this process may be repeated several times, and variation of the slurry thickness is another way to control the catalyst loading and microstructure. Furthermore, the surface area of the monolith may be increased before application of the catalyst. This task is achieved by wash-coating with $Al_2O_3$ from a bohemite solution, followed by drying and heating at 400° C.

Decomposition of Precursors. For this method, an aqueous solution of metal precursors in the appropriate stoichiometric ratios is prepared at a concentration of at least 1M. Depending on the solubility of the precursors, it is desirable to have the concentration as high as possible. As with the slurry-coating technique, the support is submerged into the solution for a defined period of time, then removed, dried, and weighed. This process is repeated until there is no weight gain (usually 3 or 4 applications), then calcined in air to produce the catalyst coating. Alternatively, the sample can be calcined between catalyst precursor applications.

Deposition-Precipitation. This method combines the decomposition technique above with the coprecipitation technique. Specifically, the support is submerged in a solution of the appropriate precursors in the necessary stoichiometric ratio. Next, $NH_4OH$ (or other precipitating reagent) is added slowly with mixing to produce the corresponding metal hydroxides, which coats all surfaces of the support materials. Since this step normally results in production of a thick gel, the concentration of the precursor solution and $NH_4OH$ need to be low to avoid pore clogging with monoliths. The metal hydroxide layer is then decomposed to the oxide by calcining in air. For noble metal-containing catalysts, the metal oxide can be deposited first, then the noble metal can be deposited using the procedure.

Figure 6:
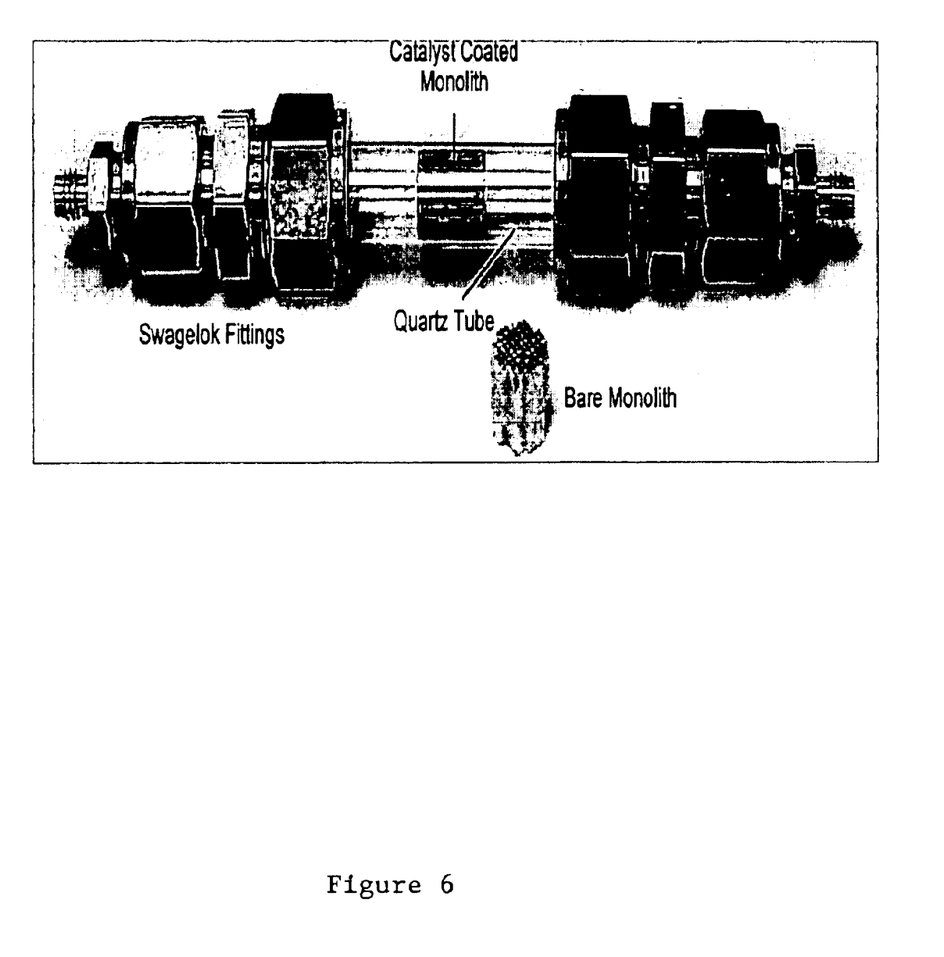
FIG. 6 is a photograph of a section of bare monolith shown next to a catalyst-coated monolith within the reactor.

Evaluation. For monolith supports, small sections of monolith are cut to fit inside a 13.8-mm i.d. quartz tube, and the tube is incorporated into the reactor assembly shown in FIG. 1. A photograph of a section of bare monolith is shown next to a catalyst-coated monolith within the reactor tube in FIG. 6. The length of the monolith (catalyst bed depth) is ~25 mm. Approximately 0.2–0.4 g of catalyst can be deposited onto a monolith of these dimensions using the techniques above. For pellet supports, the catalyst-coated pellets simply replace the monolith in the assembly. Evaluation of the supported catalysts is performed according to the conditions described above.

References

1. Gardner, S. D.; Hoflund, G. B.; Davidson, M. R.; Laitinen, H. A.; Schryer, D. R.; Upchurch, B. T. *Langmuir* 1991, 7, 2140–2145.
2. Gardner, S. D.; Hoflund, G. B.; Schryer, D. R.; Schryer, J.; Upchurch, B. T.; Kielin, E. J. *Langmuir* 1991, 7, 2135–2139.
3. Gardner, S. D.; Hoflund, G. B.; Upchurch, B. T.; Schryer, D. R.; Kielin, E. K.; Schryer, J. *J. Catal.* 1991, 129, 114–120.
4. Gardner, S. D.; Hoflund, G. B.; Schryer, D. R.; Upchurch, B. T. *J. Phys. Chem.* 1991, 95, 835–838.
5. Hardacre, C.; Rayment, T.; Lambert, R. M. *J. Catal.* 1996, 158.
6. Haruta, M.; Kobayashi, T.; Sano, H.; Yamada, N. *Chem. Lett.* 1987, 405–408.
7. Haruta, M.; Yamada, N.; Kobayashi, T.; Iijima, S. *J. Catal.* 1989, 115, 301–309.
8. Haruta, M.; Tsubota, S.; Kobayashi, T.; Kageyama, H.; Genet, M. J.; Delmon, B. *J. Catal.* 1993, 144, 175–192.
9. Haruta, M. *Catalysis Today* 1997, 36, 153.
10. Heiz, U.; Sanchez, A.; Abbet, S.; Schneider, W. D. *J. Am. Chem. Soc.* 1999, 121, 3214–3217.
11. Hoflund, G. B.; Gardner, S. D.; Schryer, D. R.; Upchurch, B. T.; Kielin, E. J. *Appl. Catal. B: Envir.* 1995, 6, 117–126.
12. Hoflund, G. B.; Gardner, S. D.; Schryer, D. S.; Upchurch, B. T.; Kielin, E. J. *Langmuir* 1995, 11, 3431–3434.
13. Hoflund, G. B.; Upchurch, B. T.; Kielin, E. J.; Schryer, D. R. *Catal. Lett.* 1995, 31, 133–141.
14. Kahlich, M.; Schubert, M. M.; Huttner, M.; Noeske, M.; Gasteiger, H. A.; Behin, R. J. *Kinetics of the selective CO*

*oxidation in H2-rich gas streams on supported noble metal catalysts*; Kahlich, M.; Schubert, M. M.; Huttner, M.; Noeske, M.; Gasteiger, H. A.; Behm, R. J., Ed.; Ecole Polytechnique: Montreal, 1997.
15. Larsson, P.-O.; Berggren, H.; Andersson, A.; Augustsson, O. *Catal. Today* 1997, 35, 137.
16. Larsson, P.; Andersson, A. *J. Catal.* 1998, 179, 72.
17. Liu, W.; Flytzani-Stephanopoulos, M. *J. Catal.* 1995, 153, 304–316.
18. Liu, W.; Flytzani-Stephanopoulos, M. *J. Catal.* 1995, 153, 317–332.
19. Ramesh, S.; Hegde, M. S. *J. Phys. Chem.* 1996, 100, 8443–8447.
20. Schryer, D. R.; Upchurch, B. T.; Norman, J. D. V.; Brown, K. G.; Schyrer, J. *J. Catal.* 1990, 122, 193–197.
21. Schyrer, D. R.; Upchurch, B. T.; Sidney, B. D.; Brown, K. G.; Hoflund, G. B.; Herz, R. K. *J. Catal.* 1991, 130, 314–317.
22. Yuan, Y.; Asakura, K.; Wan, H.; Tsai, K.; Iwasawa, Y. *Catal. Lett.* 1996, 42, 15–20.
23. Gurdag, G.; Hahn, T. *Appl. Cat. A: Gen.* 2000, 192, 51–55.
24. Bethke, G. K.; Kung, H. H. *Appl. Cat. A: Gen.* 2000, 194–195, 43–53.
25. Ito, S.-I.; Fujimori, T.; Nagashima, K.; Yuzaki, K.; Kunimori, K. *Catal. Today* 2000, 57, 247–254.
26. Sekizawa, K.; Yano, S.; Eguchi, K.; Arai, H. *Appl. Cat. A.: Gen.* 1998, 169, 291–297.
27. Stark, D. S.; Harris, M. R. *J. Phys. E: Sci. Instrum.* 1983, 16, 492.
28. Bamwenda, G. R.; Tsubota, S.; Nakamura, T.; Haruta, M. *Catal. Lett.* 1997, 44, 83–87.
29. Leitenburg, C. d.; Goi, D.; Primavera, A.; Trovarelli, A.; Dolcetti, G. *Appl. Catal. B: Environ.* 1996, 11, L29–L35.
30. Logan, A. D.; Shelef, M. *J. Mater. Res.* 1994, 9, 468–475.
31. Oh, S. H. *J. Catal* 1990, 124, 477–487.
32. Trovarelli, A. *Cat. Rev.—Sci. Eng.* 1996, 38, 439–520.
33. Trovarelli, A.; Leitenburg, C. d.; Boaro, M.; Dolcetti, G. *Catal. Today* 1999, 50, 353.
34. Holmgren, A.; Andersson, B.; Duprez, D. *Appl. Catal B: Env.* 1999, 22, 215–230.
35. Sze, C.; Gulari, E.; Demczyk, B. G. *Mat. Res. Soc. Symp. Proc.* 1993, 286, 143.
36. Cha, D. Y.; Parravano, G. *J. Catal.* 1970, 18, 200.
37. Lin, S.; Vannice, M. A. *Catal. Lett.* 1991, 10, 47.
38. Tanielyan, S. K.; Augustine, R. L. *Appl. Catal A: Gen.* 1992, 85, 73.
39. Lin, S. D.; Bollinger, M.; Vannice, M. A. *Catal. Lett.* 1993, 17, 245.
40. Herz, R. K.; Badlani, A.; Schryer, D. R.; Upchurch, B. T. *J. Catal.* 1993, 141, 219.
41. Cunningham, D. A. H.; Kobayashi, T.; Kamijo, N.; Haruta, M. *Catal. Lett.* 1994, 25, 257.
42. Vannice, M. A.; Bollinger, M. *Abstracts of Papers of the American Chemical Society* 1994, 208, 91.
43. Oh, S. H.; Sinkevitch, R. M. *J. Catal.* 1993, 142, 254–262.
44. Gonzalez-Velasco, J. R.; Gutierrez-Ortiz, M. A.; Marc, J.; Botas, J. A.; Gonzalez-Marcos, M. P.; Blanchard, G. *Appl. Catal. B: Env.* 1999, 22, 167–178.
45. Terribile, D.; Trovarelli, A.; Leitenburg, C. d.; Primavera, A.; Dolcetti, G. *Catal. Today* 1999, 47, 133.
46. Vidal, H.; Bernal, S.; Kaspar, J.; Pijolat, M.; Perrichon, V.; Blanco, G.; Pintado, J. M.; Baker, R. T.; Colon, G.; Fally, F. *Catal. Today* 1999, 54, 93–100.
47. Tschope, A.; Liu, W.; Flytzani-Stephanopoulos, M.; Ying, J. Y. *J Catal.* 1995, 157, 42–50.
48. Valden, M.; Lai, X.; Goodman, D. W. *Science* 1998, 281, 1647.
49. Perego, C.; Villa, P. *Catal. Today* 1997, 34, 281–305.
50. Holmgren, A.; Azarnoush, F.; Fridell, E. *Appl. Cat. B: Env.* 1999, 22, 49.
51. Roark, S. E.; White, J. H.; Sammells, A. F.; Keeley, J.; Dane, J. "Heterogeneous Catalysts for Near-Ambient Destruction of Volatile Organic Compounds," Eltron Research Inc., 1999.
52. Tschope, A.; Trukdeau, M. L.; Ying, J. Y. *J. Phys. Chem. B* 1999, 103, 8858–8863.
53. Stevenson, S. A.; Raupp, G. B.; Dumesic, J. A.; Tauster, S. J.; Baker, T. T. K. *Chemisorption Studies: Experimental Observations*; Stevenson, S. A.; Raupp, G. B.; Dumesic, J. A.; Tauster, S. J.; Baker, T. T. K., Ed.; Van Nostrand Reinhold Company: New York, 1987, pp 9–33.
54. Spendley, W.; Hext, G. R.; Himsworth, F. R. *Technametrics* 1962, 4, 441.
55. Velu, S.; Suzuki, K.; Osaki, T. *Chem. Commun.* 1999, 2341–2342.
56. "Hydrogen Technology Validation Plan," Department of Energy, 1998.
57. Port, O., Business Week Online, *Fuel Cells Could Be A Major Source of Electricity by 2010*; May 8, 2000.
58. O'Conner, L., *Now is the time to capitalize on the projected $2 billion fuel cells market*, Technical Insights, Apr. 20, 2000.

Although the description above contains many specificities, these should not be construed as limiting the scope of the invention but as merely providing illustrations of some of the presently-preferred embodiments of this invention. Those of ordinary skill in the art will appreciate that methods, techniques, compositions and components other than those specifically described herein can be employed in the practice of the invention without departing from its spirit scope. All references included herein are hereby incorporated by reference to the extent not inconsistent with the disclosure herein.

We claim:

1. A method for selectively removing carbon monoxide from a gas containing hydrogen comprising:

contacting said gas with a catalyst composition with the formula:

$$nN/Ce_{1-(x+y+z)}A_xA'_yA''_zO_{2-\delta}$$

where A, A', A'' are independently selected from the group consisting of: Zr, Gd, La, Sc, Sr, Co, Cr, Fe, Mn, V, Ti, Cu and Ni; N is one or more members of the group consisting of: Pt, Pd, and Au;

n is a weight percent between 0 and 25;

x, y and z are independently 0 to 0.9;

x+y+z is 0.1 to 0.9; and

δ is a number which renders the composition charge neutrals whereby the carbon monoxide in said gas is selectively removed.

2. The method of claim 1, wherein said catalyst composition contains one or more members of the group consisting of: copper, manganese and gold.

3. A reactor for selectively removing carbon monoxide from a gas which comprises:

a casing having an entrance port, an exit port and a passage therebetween for the movement of said gas from said entrance port to said exit port; and a catalyst composition in said passage with the formula:

$$nN/Ce_{1-(x+y+z)}A_xA'_yA''_zO_{2-\delta}$$

where A, A', A" are independently selected from the group consisting of: Zr, Gd, La, Sc, Sr, Co, Cr, Fe, Mn, V, Ti, Cu and Ni; N is one or more members of the group consisting of: Pt, Pd, and Au;

n is a weight percent between 0 and 25;

x, y and z are independently 0 to 0.9;

x+y+z is 0.1 to 0.9; and

δ is a number which renders the composition charge neutral.

4. The reactor of claim 3, wherein said gas contacts said catalyst composition before exiting said casing.

5. The reactor of claim 3, wherein said reactor is a component of a polymer electrolyte membrane fuel cell.

6. The reactor of claim 3, wherein the gas in said entrance port comprises carbon monoxide, hydrogen and oxygen.

7. The reactor of claim 3, wherein said catalyst composition is coated on a support surface.

8. The reactor of claim 3, wherein said gas in said entrance port is a fuel for a fuel cell.

9. A catalyst composition for selectively removing carbon monoxide from a gas containing hydrogen with the formula:

$$nN/Ce_{1-(x+y+z)}A_xA'_yA''_zO_{2-\delta}$$

where A, A', A" are independently selected from the group consisting of: Zr, Gd, La, Sc, Sr, Co, Cr, Fe, Mn, V, Ti, Cu and Ni; N is one or more members of the group consisting of: Pt, Pd, and Au;

n is a weight percent between 0 and 25;

x, y and z are independently 0 to 0.9;

x+y+z is 0.1 to 0.9; and

δ is a number which renders the composition charge neutral, wherein said catalyst composition contains one or more members of the group consisting of: copper, manganese and gold.

10. The catalyst composition of claim 9 having the formula $Ce_{0.5}Cu_{0.5}O_w$, where w is a number that renders the composition change neutral.

11. The catalyst composition of claim 9 having the formula $Ce_{0.475}Zr_{0.05}Mn_{0.475}O_w$, where w is a number that renders the composition change neutral.

12. The catalyst composition of claim 9 having the formula $Ce_{0.475}Zr_{0.5}Mn_{0.5}O_w$, where w is a number that renders the composition change neutral.

13. The catalyst composition of claim 9 having the formula $Ce_{0.45}Zr_{0.05}Mn_{0.05}O_w$, where w is a number that renders the composition change neutral.

14. The catalyst composition of claim 9 having the formula $Ce_{0.5}Fe_{0.1}Cu_{0.4}O_w$, where w is a number that renders the composition change neutral.

15. The catalyst composition of claim 9 having the formula $Ce_{0.1}Mn_{0.45}Cu_{0.45}O_w$, where w is a number that renders the composition change neutral.

16. The catalyst composition of claim 9 having the formula $Ce_{0.1}Mn_{0.45}Fe_{0.55}O_w$, where w is a number that renders the composition change neutral.

17. The catalyst composition of claim 9 having the formula $Ce_{0.3}Mn_{0.7}O_w$, where w is a number that renders the composition change neutral.

18. The catalyst composition of claim 9 having the formula $Ce_{0.3}Mn_{0.65}Zr_{0.05}O_w$, where w is a number that renders the composition change neutral.

* * * * *